(12) United States Patent
Mollhagen (10) Patent No.: US 11,058,096 B2
(45) Date of Patent: *Jul. 13, 2021

(54) APPARATUS FOR RESTRAINING THE LOWER LEGS AND FEET OF A LIVESTOCK ANIMAL

(71) Applicant: Jon Davis Mollhagen, Lorraine, KS (US)

(72) Inventor: Jon Davis Mollhagen, Lorraine, KS (US)

(*) Notice: Subject to any disclaimer, the term of this patent is extended or adjusted under 35 U.S.C. 154(b) by 481 days.

This patent is subject to a terminal disclaimer.

(21) Appl. No.: 16/104,884

(22) Filed: Aug. 18, 2018

(65) Prior Publication Data

US 2019/0261603 A1    Aug. 29, 2019

Related U.S. Application Data

(63) Continuation of application No. 14/879,886, filed on Oct. 9, 2015, now Pat. No. 10,051,840.

(60) Provisional application No. 62/061,990, filed on Oct. 9, 2014.

(51) Int. Cl.
| | |
|---|---|
| *A01K 15/04* | (2006.01) |
| *A01K 1/06* | (2006.01) |
| *A01K 29/00* | (2006.01) |
| *A61D 3/00* | (2006.01) |

(52) U.S. Cl.
CPC ............ *A01K 15/04* (2013.01); *A01K 1/0613* (2013.01); *A01K 29/00* (2013.01); *A61D 3/00* (2013.01); *A61D 2003/006* (2013.01)

(58) Field of Classification Search
CPC ...... A01K 15/04; A01K 1/0613; A01K 29/00; A61D 3/00; A61D 2003/006

USPC ...................................... 74/45–48, 567, 569
See application file for complete search history.

(56) References Cited

U.S. PATENT DOCUMENTS

| 2,904,005 A * | 9/1959 | Mielke ................... A01K 15/04 |
| | | 119/520 |
| 2,955,571 A | 10/1960 | Krahn |
| 3,023,734 A | 3/1962 | Schaub |
| 3,997,940 A | 12/1976 | Prince |

(Continued)

FOREIGN PATENT DOCUMENTS

| WO | WO 2001/058270 | 8/2001 |
| WO | WO 2014/081379 | 5/2014 |

OTHER PUBLICATIONS

PCT /US2015/054987 International Search Report dated Jan. 5, 2016.

*Primary Examiner* — Marc Burgess
(74) *Attorney, Agent, or Firm* — Robert O. Blinn (57) ABSTRACT

An apparatus for securing the legs of livestock animals includes a frame also which defines an entrance and an exit and which presents sidewalls which extend between the entrance and the exit thereby presenting a chute suitable for the ingress and egress of a livestock animal. Near the floor of the chute and between the entrance and the exit are leg bars which are able to move between a retracted position suitable for allowing the lower legs of a livestock animal to move freely between the leg bars and the sidewalls and an extended position in which the leg bars are closer to the sidewalls so that the lower legs of a livestock animal are held securely between the leg bars and sidewalls. The apparatus can be used to secure the lower legs of a livestock animal and thereby immobilize the animal.

7 Claims, 10 Drawing Sheets

(56) References Cited

U.S. PATENT DOCUMENTS

| | | | |
|---|---|---|---|
| 4,162,685 A * | 7/1979 | Knappenberger | A61D 3/00 |
| | | | 119/723 |
| 5,070,818 A | 12/1991 | Gearn | |
| 6,470,831 B1 * | 10/2002 | Taylor | A01K 1/0613 |
| | | | 119/525 |
| 9,675,041 B2 * | 6/2017 | Eriksson | A01K 1/126 |
| 2014/0230753 A1 | 8/2014 | Mollhagen | |
| 2016/0100555 A1 | 4/2016 | Mollhagen | |

* cited by examiner

APPARATUS FOR RESTRAINING THE LOWER LEGS AND FEET OF A LIVESTOCK ANIMAL

CROSS REFERENCES TO RELATED APPLICATIONS

This application is a continuation of U.S. patent application Ser. No. 14/879,886 filed on Oct. 9, 2015, which is incorporated herein by reference.

U.S. patent application Ser. No. 14/879,886 claimed the benefit of U.S. Provisional Patent Application No. 62/061,990 filed on Oct. 9, 2014 which is incorporated herein by reference.

FIELD

The present invention relates to an apparatus for restraining the lower legs of a livestock animal.

BACKGROUND

Typical livestock animal chutes for restraining livestock animals have included inward moving panels within a frame which squeeze the body of the livestock animal. An apparatus which squeezes the body of the animal still leaves the legs free for kicking. A large livestock animal that is kicking presents a serious hazard to those who are working with the animal. The applicant has discovered that all that is needed to immobilize a large livestock animal is to immobilize all four feet of the animal. If all four feet are secured, the livestock animal can not move and the livestock animal can not kick.

SUMMARY

The present livestock animal securing apparatus includes a chute which has a floor, an entryway and an exit as well as sidewalls which extend between the entrance and the exit. A set of longitudinal leg bars is situated near the floor of the chute between the entrance and the exit. The leg bars are moveably mounted for translation between a first retracted position in which the leg bars are spaced away from their respective adjacent sidewalls by a first distance suitable for allowing free movement of an animal's lower legs between the leg bars and the sidewalls and a second extended position in which the leg bars are spaced away from each of their adjacent sidewalls by as second distance that is smaller than the first distance, the second distance being such that the lower legs of a livestock animal are held securely between the leg bars and the sidewalls. Both the sidewalls and the leg bars are preferably padded with a suitable flexible material to prevent injury to the animal so restrained. When the lower legs of a livestock animal are securely held by the apparatus as described above, the animal is not able to kick or move from its secured position.

DETAILED DESCRIPTION

Figure 1:
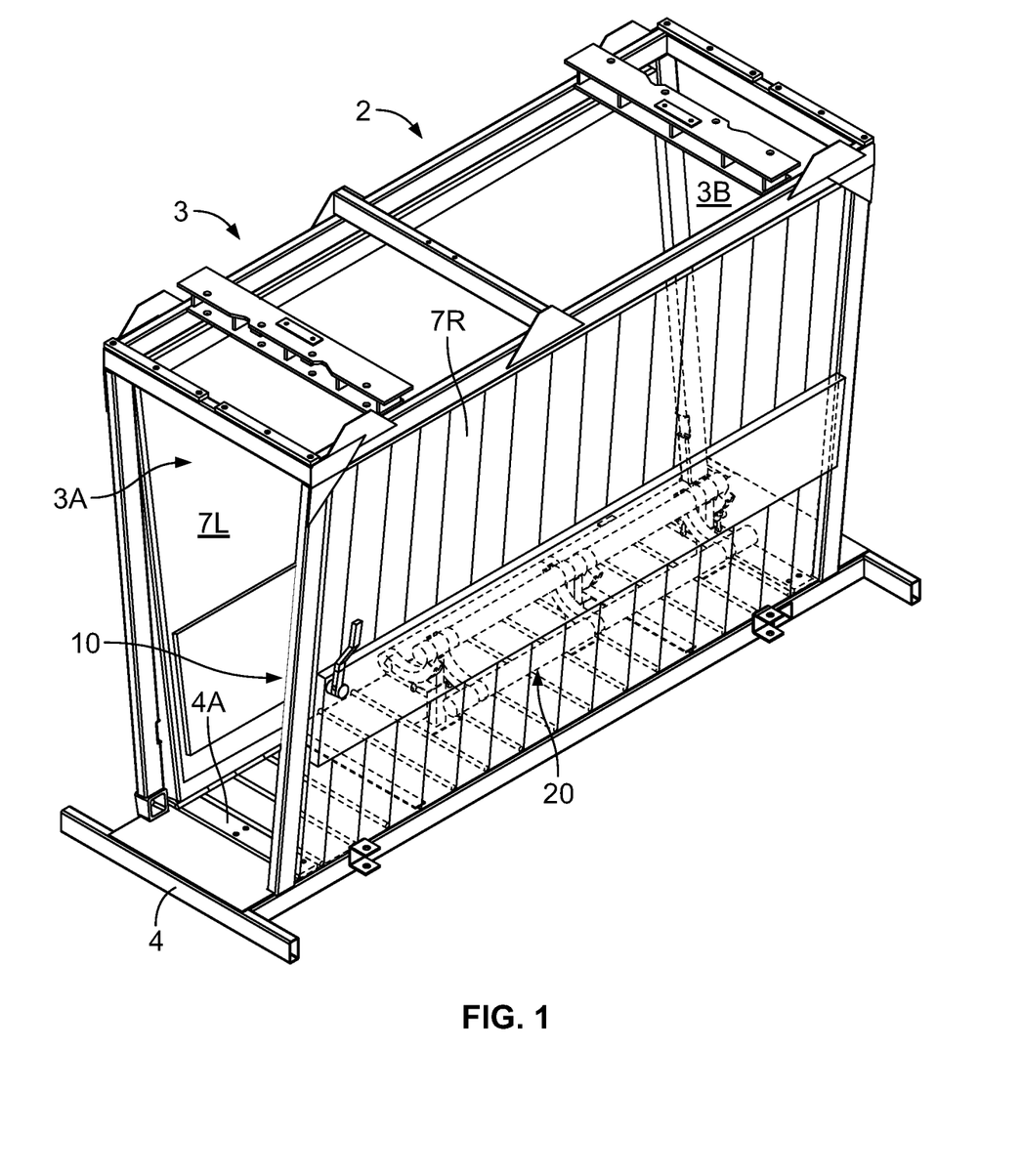
FIG. 1 is a perspective view of a chute with one embodiment of a lower leg restraining apparatus.

Referring to the drawings, FIG. 1 shows one embodiment of a leg restraining apparatus 10 which is incorporated into a livestock animal chute 2. Livestock animal chute 2 includes a frame 3 having a base 4. Base 4 presents a floor 4A which is suitable for being traversed by a livestock animal. Frame 3 is arranged to define an entrance 3A and an exit 3B. Opposing left and right sidewalls 7L and 7R extend between entrance 3A and the exit 3B thereby defining a chute suitable for the ingress and egress of a livestock animal. As can be seen in FIGS. 1-6, a leg securing mechanism 20 is mounted to floor 4A of base 4. As can be seen in FIGS. 1-6, in this example, leg securing mechanism 20 is located generally and preferable equidistantly between the left and right sidewalls 7L and 7R. In this example, leg securing mechanism 20 appears to be disposed closer to exit 3B than to entrance 3A and is shorter than animal chute 2. However, leg securing mechanism 20 may also extend nearly the full length of animal chute 2. The lower portions of left and right sidewalls 7L and 7R are preferably furnished with padded portions 7LP and 7RP which cooperate with leg securing mechanism 20 as will be described in greater detail below to provide leg restraining apparatus 10.

Figure 2A:
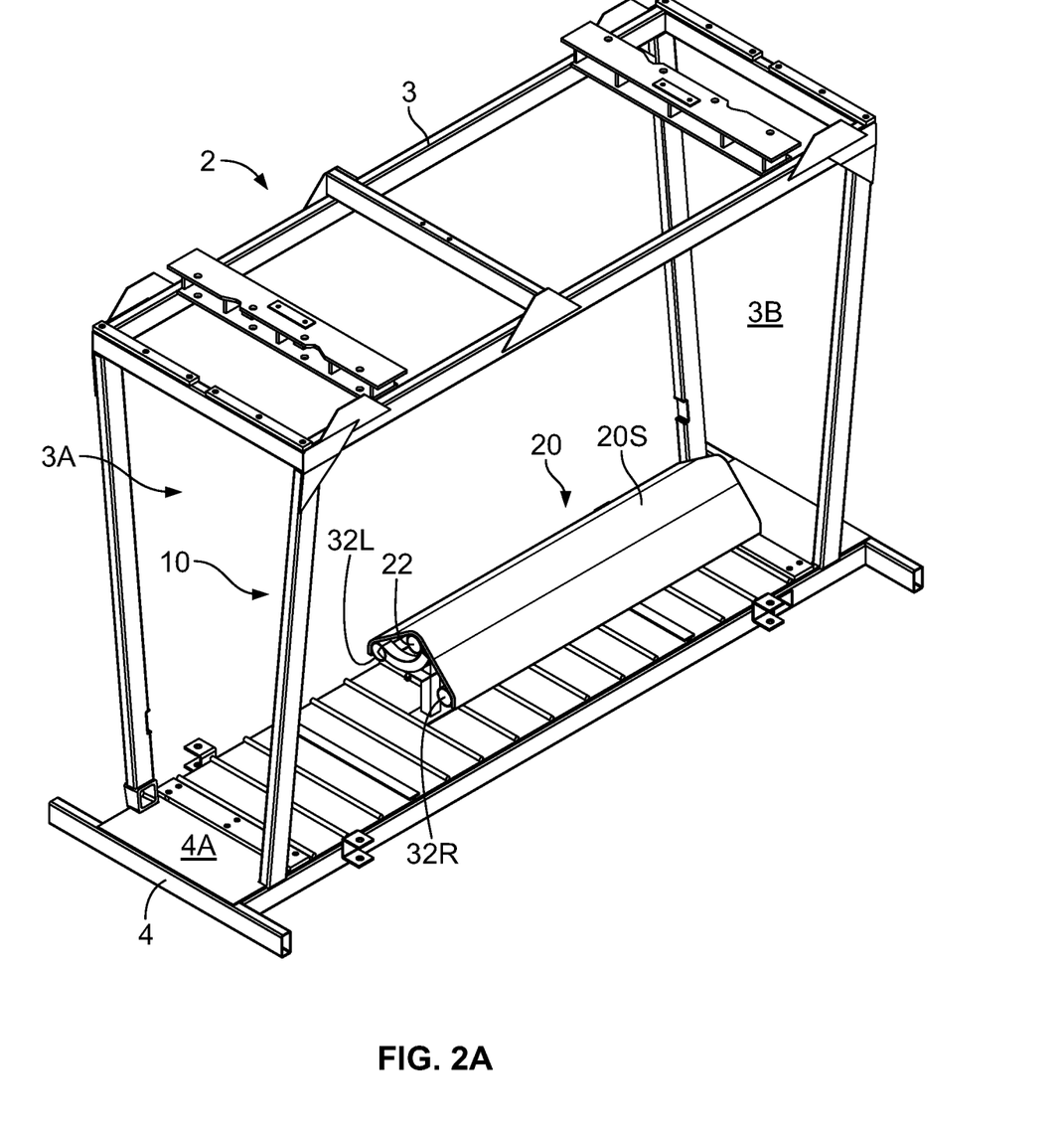
FIG. 2A is a second perspective view of a chute having one embodiment of a lower leg restraining apparatus with the sidewalls removed.
Figure 2B:
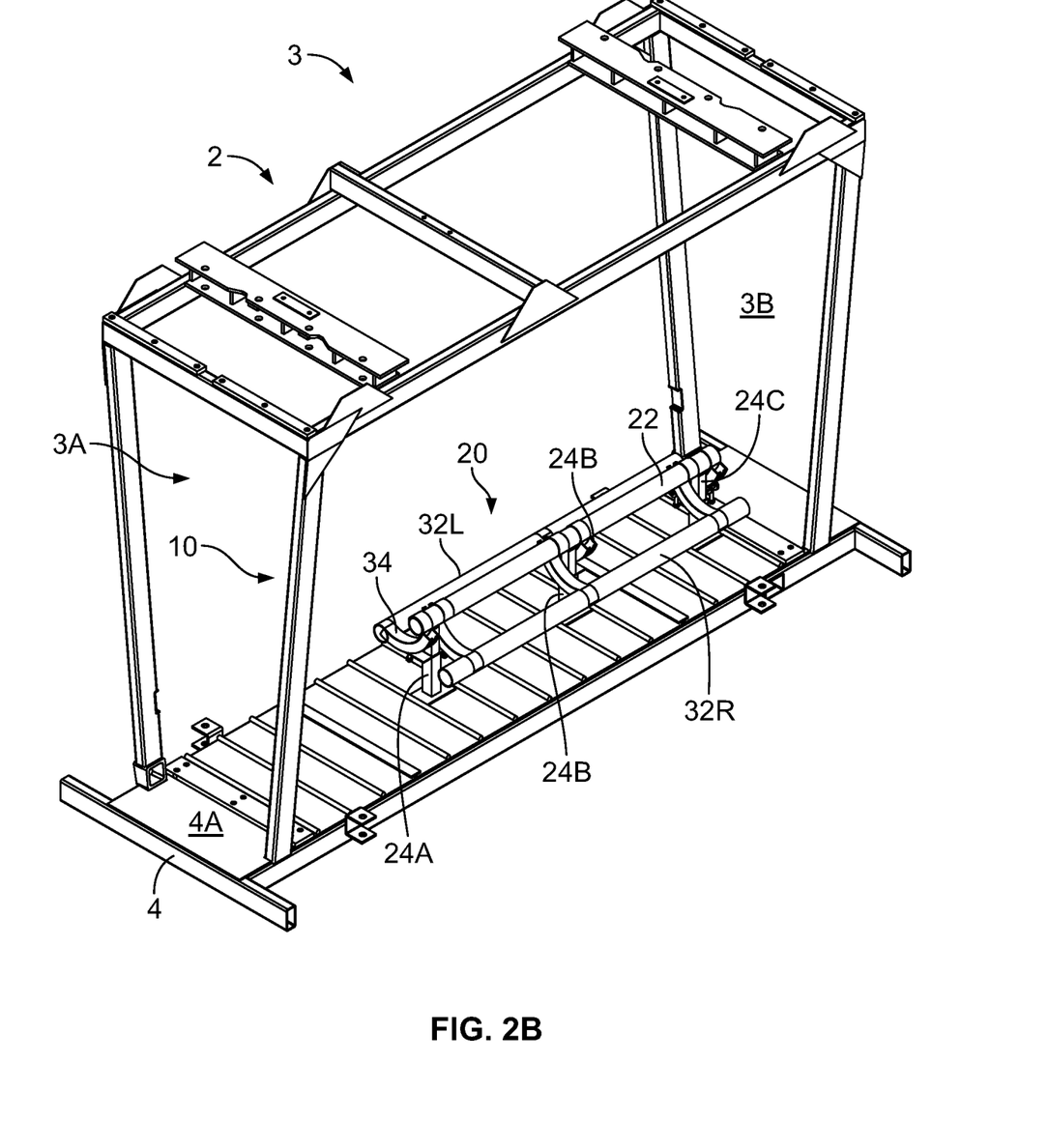
FIG. 2B is a second perspective view of the chute having one embodiment of a lower leg restraining apparatus as shown in FIG. 2A with the flexible covering removed from the leg restraining mechanism for clarity.
Figure 3:
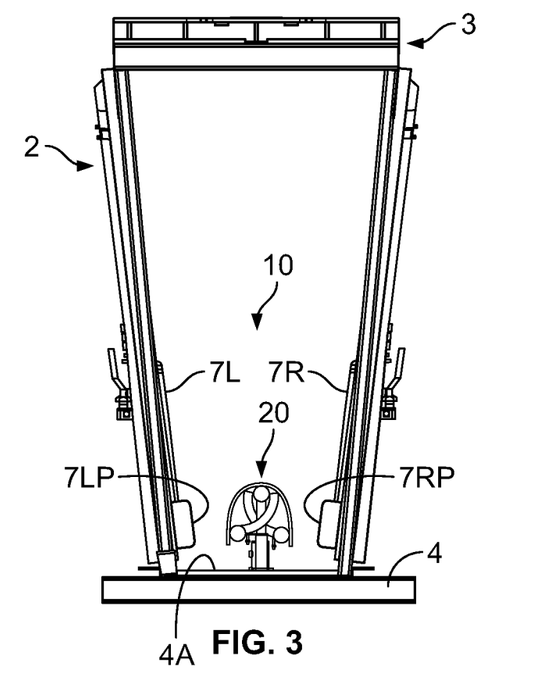
FIG. 3 is end view of one embodiment of a lower leg restraining apparatus shown with a leg restraining mechanism in a retracted position.
Figure 4:
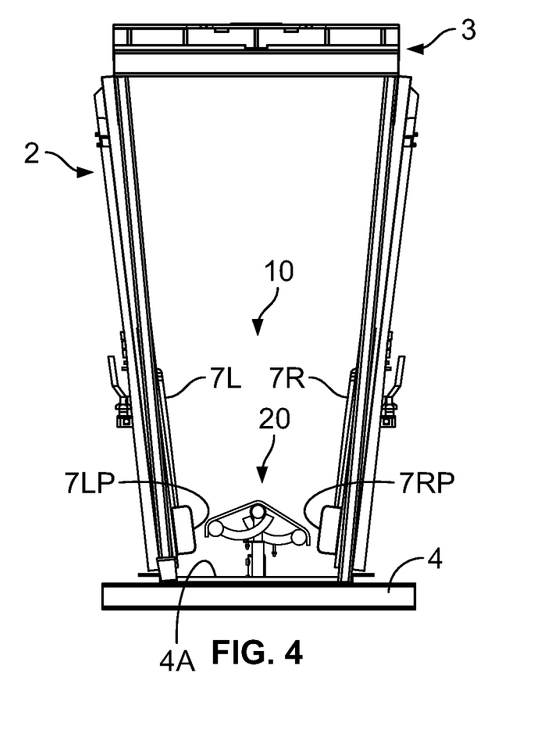
FIG. 4 is end view of one embodiment of a lower leg restraining apparatus shown with a leg restraining mechanism in an extended position.
Figure 7:
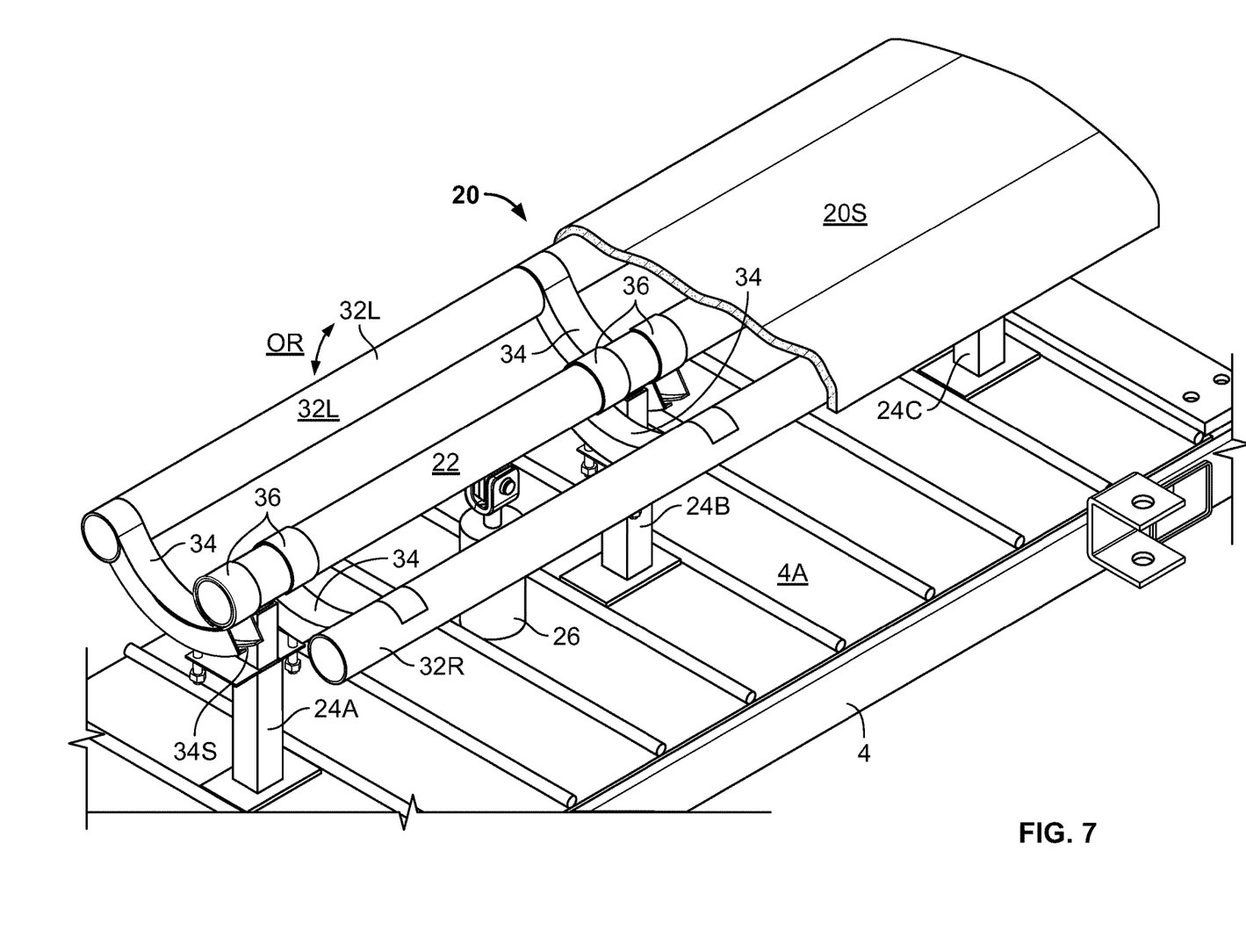
FIG. 7 is an enlarged perspective view of the leg restraining mechanism shown in the retracted position with the flexible cover removed for clarity.
Figure 8:
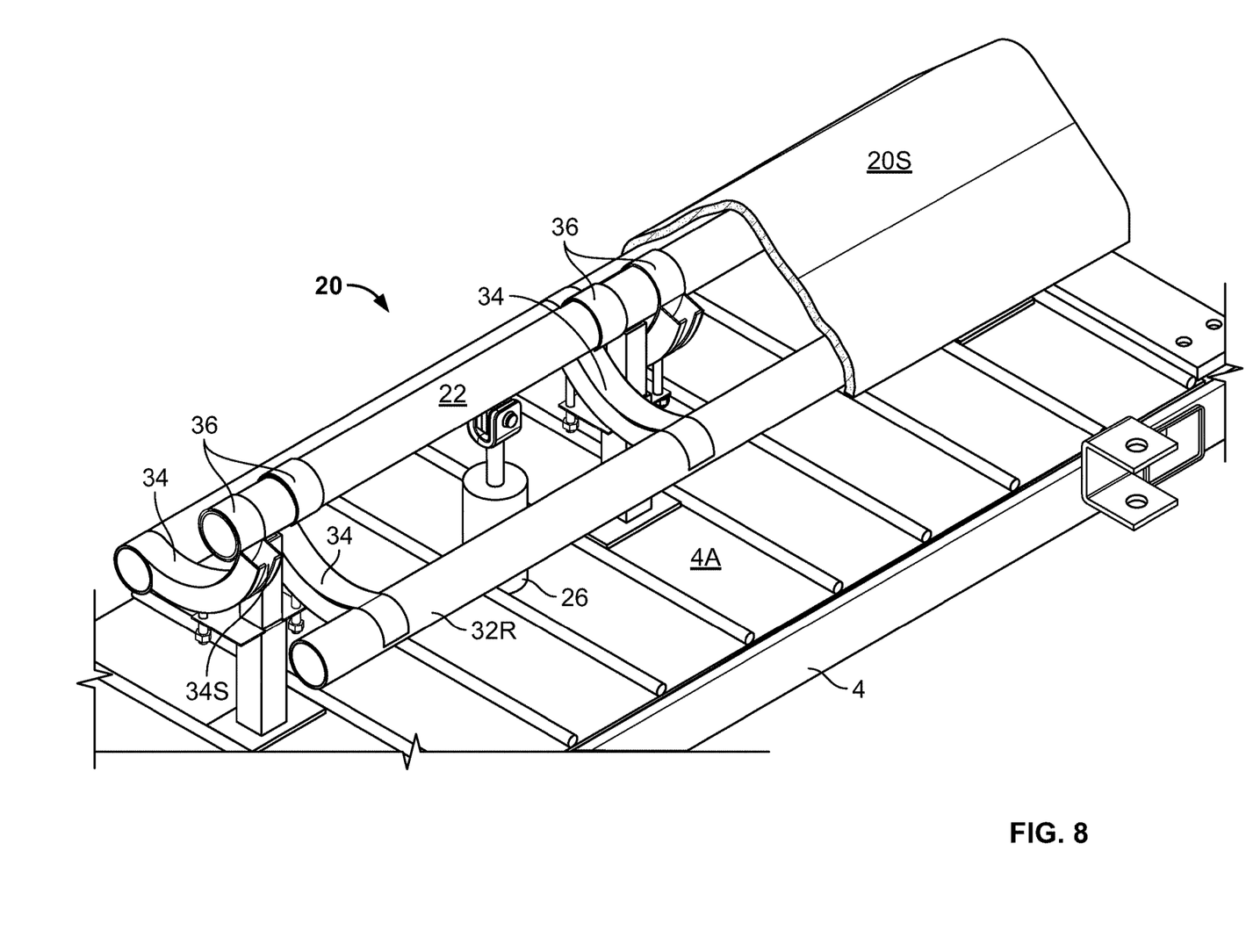
FIG. 8 is an enlarged perspective view of the leg restraining mechanism shown in the extended position with the flexible cover removed for clarity.

As can be seen in FIG. 2, leg securing mechanism 20 includes a support member 22 which is preferably positioned generally equidistantly between sidewalls 7L and 7R. In this example, support column 22 is a cylindrical pipe which preferably has a uniform outside diameter. As can be seen in FIG. 7, support column 22 is supported by a set of telescoping columns 24A, 24B and 24C. In this example, three telescoping columns are employed, but the skilled reader will appreciate that preferably at least two telescoping columns would be needed to adequately support support column 22. As can be best understood by referring to FIGS. 10 and 11, telescoping columns 24A, 24B and 24C are arranged to exclusively accommodate the vertical movement of support column 22 between a first raised position shown in FIG. 10 and a second lowered position shown in FIG. 11. As can be seen in FIGS. 7 and 8, an actuator 26 connects between base 4 of frame 3 and the support column. In this example actuator 26 is a hydraulic cylinder but actuator 26 may be any suitable actuator. The actuator is preferably controllable by an operator for moving support column 22 between the first raised position shown in FIG. 10 and second lowered position shown in FIG. 11.

As can also be seen in FIG. 2, leg securing mechanism 20 further also includes a left leg bar 32L and a right leg bar 32R. Left and right leg bars 32L and 32R are arranged on opposite sides of support column 22 and are each connected to support member 22 by a set of arms 34 which are preferably symmetrically identical and preferably interchangeable at least on each side of leg securing mechanism 20. As can be best seen in FIG. 8, in this example, each arm 34 has a generally square, hollow cross section and is formed in a curved or arc shape.

As can be best seen in FIGS. 7-11, the proximal end of each arm 34 is connected to support column 22 by a strap 36 which extends from the surface arm 34 which is adjacent to support column 22. In each case, strap 36 wraps around support member 22 and thereby forms a bushing around support column 22 which functions much like the portion of a hinge plate which is formed around a hinge pin. Accordingly, the proximal ends of arms 34 are rotatably connected to support column 22 to allow of arms 34 to rotate relative to support column 22 as shown in FIGS. 7-11. In this example, the distal ends of arms 34 are fixed to leg bars 32L and 32R as shown in FIGS. 7-11 so that leg bars 32L and 32R are able to move between a retracted position shown in FIG. 10 and an extended position shown in FIG. 11.

Leg securing mechanism 20 is arranged such that when support column 22 moves from the first raised positon to the second lowered positon, leg bars 32L and 32R translate outboard. Also, when leg bars 32L and 32R move outboard, they also move slightly upwardly along a curved path relative to floor 4A.

Figure 9:
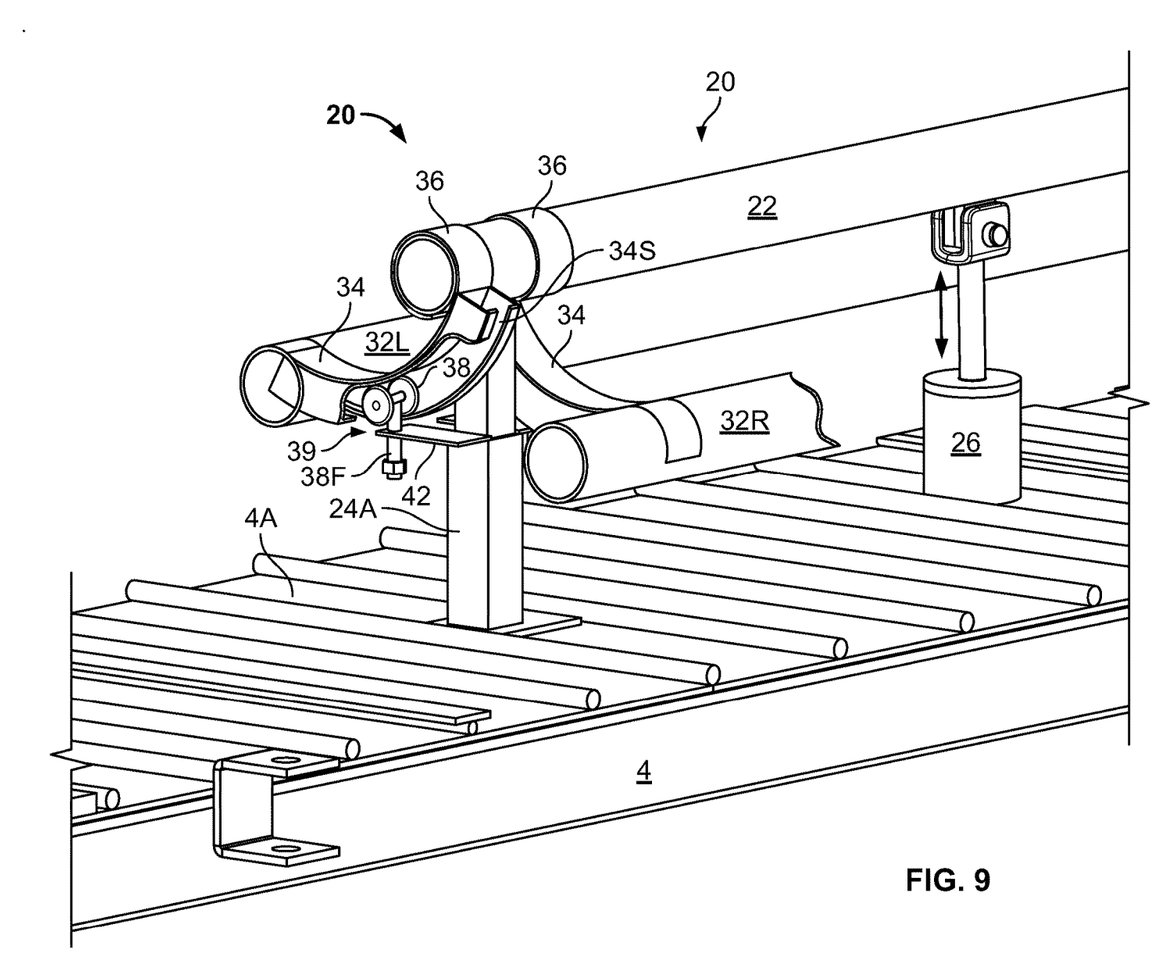
FIG. 9 is an enlarged perspective view of the leg restraining mechanism with the flexible cover removed for clarity and with one of the leg bars broken away to reveal an actuator and one of the arms extending between the central support column and one of the leg bars broken away to show the internal arrangement of the arm and the finger mounted roller which engages the arm.
Figure 10:
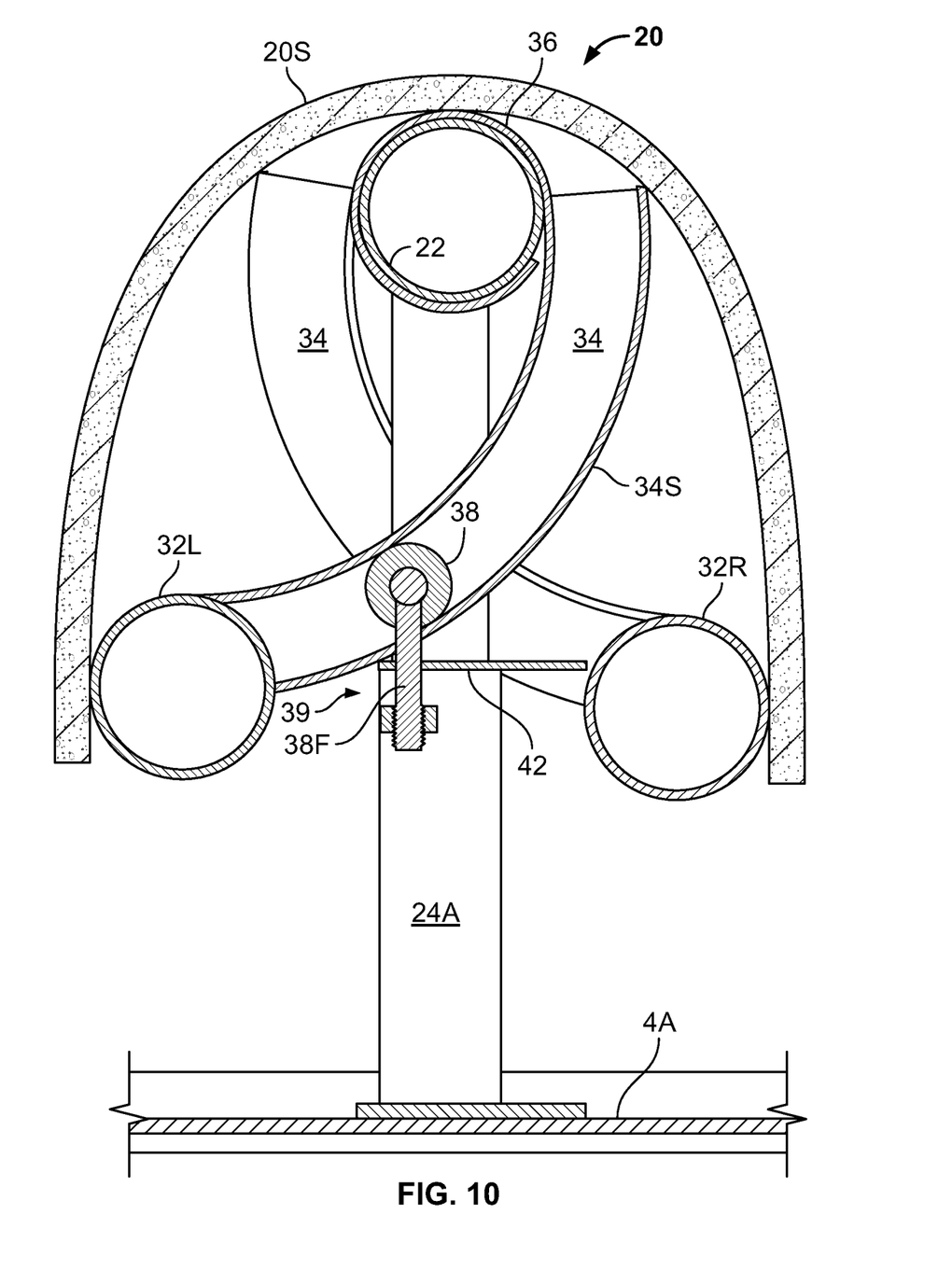
FIG. 10 is an enlarged end view of the leg restraining mechanism cut away to show the internal arrangement of one arm with the leg restraining mechanism in a fully retracted position.
Figure 11:
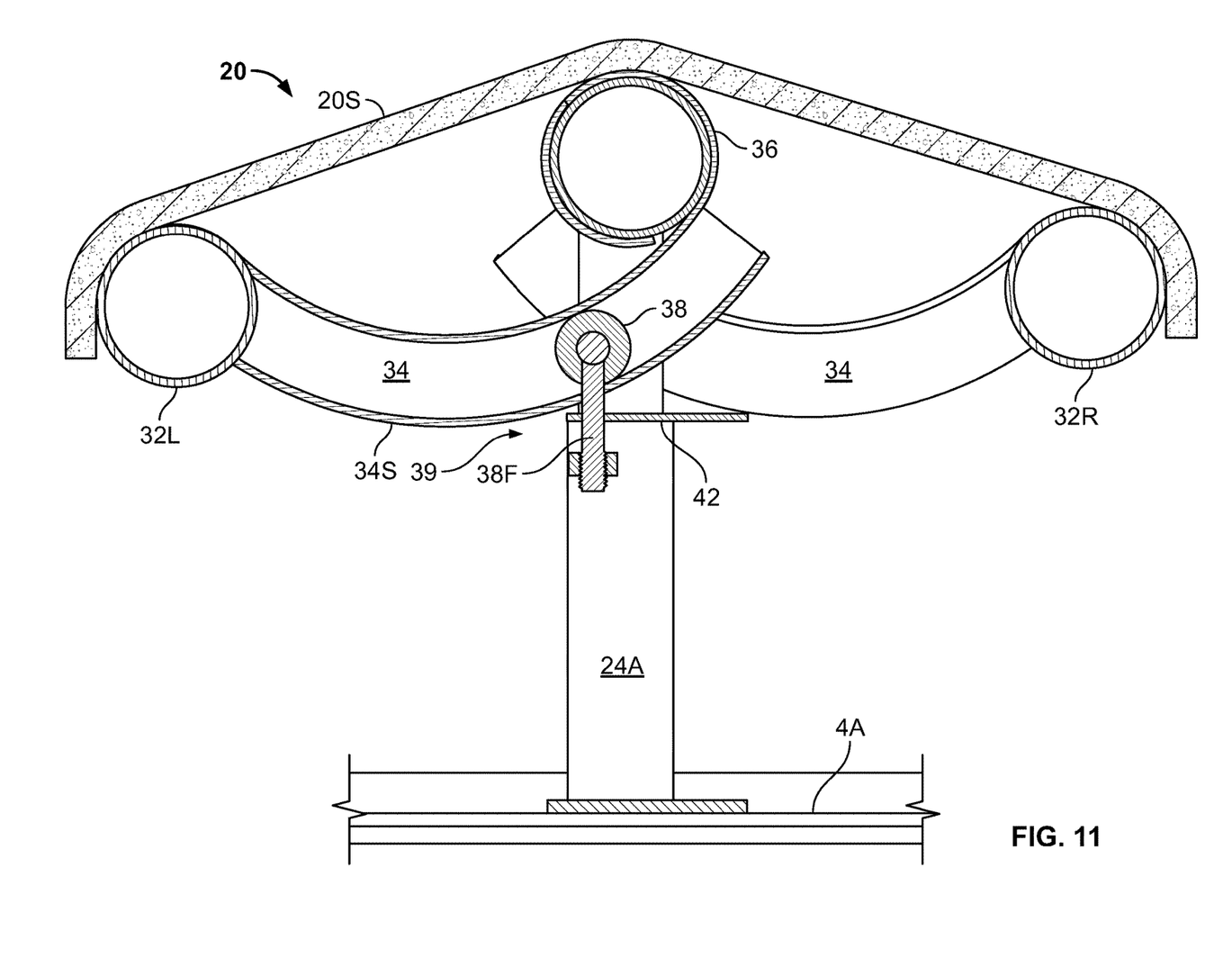
FIG. 11 is an enlarged end view of the leg restraining mechanism cut away to show the internal arrangement of one arm with the leg restraining mechanism in a fully extended position.

In this example, the outboard translation of leg bars 32L and 32R is constrained in a gently upwardly curving path because each arm 34 is translatably engaged by an element which is generally stationary with respect to frame 3. As noted above arms 34 are curved. In this example, each underside surface of each arm 34 presents a longitudinal slot 34S. As noted above, each arm 34 is hollow and in this example each arm 34 has a generally square cross section. Accordingly, as can be seen in FIGS. 9-11, each arm 34 is able to receive a roller 38 of a roller assembly 39. In each roller assembly 39, each roller 38 is rotatably mounted at the end of a finger 38F which is sized to be received by slot 34S. Each finger 38F, in turn, in this example, is fixed to a bracket 42 which, in turn, is fixed relative to floor 4A. Therefore, each roller assembly 39 (with the possible exception of rotating roller 38) is fixed relative to frame 3. In this example, the translatably engaging element is a roller assembly having a roller which is received within each arm, but the skilled reader will appreciate that any one of a number of engaging elements may be substituted for the roller arrangement described immediately above.

As can be best seen in FIGS. 10 and 11, the motions of arms 34 are constrained by roller assemblies 39 as leg securing mechanism 20 moves between the first retracted position shown in FIG. 10 and the second extended position shown in FIG. 11. And, because of the geometry of this mechanism including the curved shape of arms 34, in this example, the outboard path of each leg bar 32L and 32R describes a gently upwardly rising curved path. Preferably, leg restraining mechanism 20 is covered by a flexible covering 20S as shown in FIG. 2A. In this example, flexible covering 20S may be fashioned from belted rubber or a similar, comparable material. It is preferable that flexible covering 20S be arranged and secured to support column 22 and leg bars 32L and 32R such that it would not be possible for a livestock animal to place one of its legs between support column 22 and either of leg bars 32L or 32R.

Figure 5:
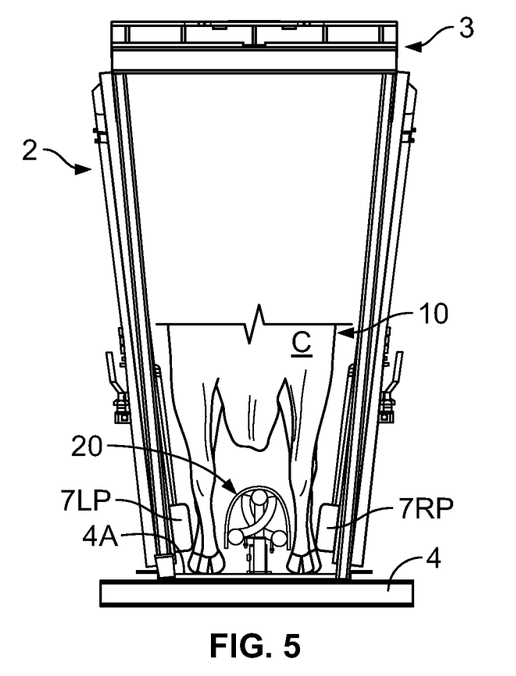
FIG. 5 is end view of one embodiment of a lower leg restraining apparatus shown with a leg restraining mechanism in the retracted position and also shown with a broken away lower portion of a livestock animal in order to illustrate that the lower legs of the livestock animal are able to freely between the leg restraining mechanism and the sidewalls of the chute.
Figure 6:
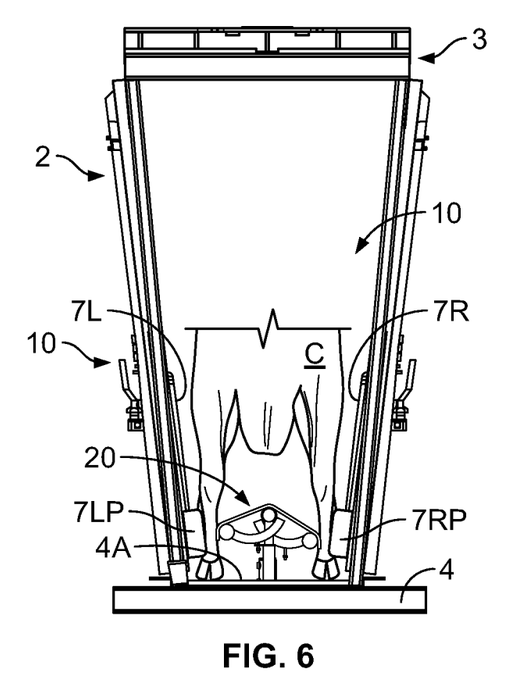
FIG. 6 is end view of a one embodiment of a lower leg restraining apparatus shown with a leg restraining mechanism in the extended position and also shown with a broken away lower portion of a livestock animal in order to illustrate that the lower legs of the livestock animal are secured between the leg restraining apparatus and the sidewalls such that the livestock animal is not able to move its legs.

As can be best seen in FIGS. 5 and 6, sidewalls 7A and 7B may present padded portions 7P1 and 7P2 which are generally positioned to be opposite from leg bars 32L and 32R respectively particularly when leg bars 32L and 32R are in the outboard position shown in FIG. 11. Thus, leg restraining mechanism 20 is preferably arranged so that the lower portions of a livestock animal's legs are pressed between padded padded portions 7P1 and 7P2 and flexible covering 20S which covers leg bars 32L and 32R. The objective is for restraining mechanism 20 to apply sufficient pressure to immobilize the legs of an animal C (indicated in FIGS. 5 and 6) without inflicting any significant injury to the legs of the animal C. A livestock animal thus immobilized is essentially incapable of kicking and even incapable of substantial bodily movements.

It is also preferable in this embodiment for sidewalls 7A and 7B to be mounted on movable panels which are able to be adjustably moved within frame 3. In this example, sidewalls 7A and 7B are able to be adjusted in unison in the outboard direction and inboard direction at their upper ends. Also in this example, sidewalls 7A and 7B are able to be adjusted in unison in the outboard direction and inboard direction at their lower ends. This makes it easier to accommodate different sizes of livestock animals.

Except for components which are more preferably fashioned from foam rubber, flexible belted rubber or injection molded plastic such as would be the case, for example, for padded portions 7P1 and 7P2, for flexible covering 20S or rollers 38, most of the components described above are preferably fashioned from high strength steel or some other appropriately strong, durable material. The general size of apparatus 10 would be determined by the general range of sizes found in a particular type of livestock animal. In most cases, apparatus 10 would be employed for working cattle but apparatus 10 could be adapted for use with other types of livestock animals.

As can be understood from the above description, apparatus 10 provides a useful article of equipment which is able to be used to secure and immobilizing the lower legs and feet of livestock animals thereby preventing kicking and also substantially immobilizing the livestock animal from other bodily movements.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. An apparatus for securing the legs of a livestock animal, comprising:
   (a) a frame including a base which comprises a floor suitable for being traversed by a livestock animal, the frame also defining an entrance and an exit and further comprising sidewalls that extend between the entrance and the exit thereby defining a chute suitable for the ingress and egress of a livestock animal, the lower margins of the sidewalls comprising longitudinally arranged padded zones,
   (b) a leg securing mechanism mounted to the floor of the base, the leg securing mechanism being disposed between the sidewalls, the leg securing mechanism including support columns, the support columns movably mounted such that the upper ends of the support columns are able to move between a first raised position and a second lowered position,
   (c) opposing curved arms mechanically associated with the support columns, the opposing curved arms each having a proximate end and a distal end, the proximate end of each opposing curved arm being rotatably mounted at least indirectly to the support columns, each curved arm extending around in relation to a support column and laterally away from a support column, the opposing curved arms being arranged in opposing symmetrical relationships with each other,
   (d) guide assemblies fixed at least indirectly to the support columns, the guide assemblies being adapted to engage and guide the movement of the curved arms such that when the upper ends of the support columns move from the raised position to the lowered position, the distal ends of the curved arms move from an inboard position to an outboard position,
   (e) longitudinally arranged leg bars that are mounted to the distal ends of the curved arms, such that when the support columns are moved in unison between the raised position and the lowered position, the leg bars move in unison between an inboard position and an outboard position such that when the leg bars are in the outboard position they are sufficiently proximate to the lower margins of the side walls such that portions of the lower legs of a livestock animal are able to be secured between the lower margins of the side walls and the leg bars.

2. The apparatus of claim 1, wherein:
a support member connects between the upper ends of the support columns and the opposing curved arms are rotatably mounted to the support bar.

3. The apparatus of claim 2, wherein:
the support columns and the support member are moved between the first raised position and the second lowered position by an actuator.

4. The apparatus of claim 3, wherein:
the actuator is an hydraulic actuator.

5. The apparatus of claim 1, wherein:
the guide assemblies are fixed to the support columns and comprise rollers that are rollably received by the opposing curved arms.

6. The apparatus of claim 1, wherein:
the opposing curved arms have slots and the guide assemblies are fixed to the support columns and comprise rollers that are rollably received by the slots of the opposing curved arms.

7. The apparatus of claim 1, wherein:
the leg bars are padded.

* * * * *